United States Patent
Hertaus (10) Patent No.: US 11,457,767 B1
(45) Date of Patent: Oct. 4, 2022

(54) MULTI-DIRECTIONAL MOVEMENT COUNTERTOP APPLIANCE ROLLING TRAY

(71) Applicant: Nifty Home Products Inc., Madison Lake, MN (US)

(72) Inventor: Todd Hertaus, New Market, MN (US)

(73) Assignee: Nifty Home Products Inc., Madison Lake, MN (US)

(*) Notice: Subject to any disclaimer, the term of this patent is extended or adjusted under 35 U.S.C. 154(b) by 0 days.

(21) Appl. No.: 17/200,636

(22) Filed: Mar. 12, 2021

Related U.S. Application Data (63) Continuation-in-part of application No. 16/879,510, filed on May 20, 2020, now Pat. No. 11,083,339.

(60) Provisional application No. 63/082,127, filed on Sep. 23, 2020, provisional application No. 62/988,596, filed on Mar. 12, 2020.

(51) Int. Cl.
*A47J 36/34* (2006.01)
*A47J 47/16* (2006.01)
*F16M 11/22* (2006.01)
*F16M 11/42* (2006.01)

(52) U.S. Cl.
CPC .............. *A47J 36/34* (2013.01); *A47J 47/16* (2013.01); *F16M 11/22* (2013.01); *F16M 11/42* (2013.01); *F16M 2200/08* (2013.01)

(58) Field of Classification Search
CPC ........ A47J 36/34; A47J 47/16; A47J 31/4403; F16M 11/22; F16M 11/42; F16M 2200/08; A47B 88/41; A47B 88/483; A47B 2210/04; A47B 2088/901; A47B 2210/07; A47B 2210/01; B60B 33/0063; B60B 33/066; B60B 2200/49
See application file for complete search history.

(56) References Cited

U.S. PATENT DOCUMENTS

| | | | |
|---|---|---|---|
| 2,311,928 A | 7/1941 | Buehler | |
| 2,874,971 A * | 2/1959 | Devery | B60B 33/06 280/46 |
| 3,635,491 A * | 1/1972 | Drews | B60B 33/06 280/43.17 |
| 4,417,738 A | 11/1983 | Kendall | |
| 4,615,502 A | 10/1986 | McLaughlin | |
| 6,216,994 B1 * | 4/2001 | Yeh | A47B 21/0314 248/346.06 |

(Continued)

*Primary Examiner* — Ko H Chan
(74) *Attorney, Agent, or Firm* — Michael A. Bondi; Moss & Barnett (57) ABSTRACT

A multi-directional movement countertop appliance rolling tray that includes a support surface, at least one high friction support, at least one first multi-directional low friction moving device and a movement lever. The support surface has a front edge, a back edge, a first side edge and a second side edge that extend there around. The at least one high friction support is proximate the front edge of the support surface. The movement lever is operably mounted with respect to the support surface. The at least one first multi-directional low friction moving device is rotatably mounted to the movement lever. The movement lever is movable between a first position and a second position. When the movement lever is in the second position, a lower surface of the first multi-directional low friction moving device extends further from the support surface than a lower surface of the at least one high friction support.

21 Claims, 3 Drawing Sheets

(56) References Cited

U.S. PATENT DOCUMENTS

| | | | | |
|---|---|---|---|---|
| 6,240,830 B1* | 6/2001 | Goldston | ............... | A47J 31/44 |
| | | | | 99/290 |
| 6,470,793 B1 | 10/2002 | Vogt | | |
| 6,691,961 B2 | 2/2004 | Solomon | | |
| 7,568,667 B1* | 8/2009 | Feik | ................. | B44D 3/14 |
| | | | | 248/128 |
| 7,983,035 B1* | 7/2011 | Ting | ................. | F16M 11/105 |
| | | | | 361/679.55 |
| 8,733,714 B1* | 5/2014 | Reitmann | ............... | A47J 45/10 |
| | | | | 248/346.11 |
| 8,914,943 B2* | 12/2014 | Grassia | ............... | B60B 33/0015 |
| | | | | 99/279 |
| 9,192,266 B2 | 11/2015 | Starr | | |
| 10,100,969 B1* | 10/2018 | Zhu | ................. | B62B 5/0089 |
| 10,279,994 B2* | 5/2019 | Russell | ................ | B65F 1/1473 |
| 2001/0035485 A1 | 11/2001 | Davis | | |
| 2007/0241452 A1 | 10/2007 | Wu | | |
| 2013/0186902 A1* | 7/2013 | Bar-Shlomo | ............ | B05C 21/00 |
| | | | | 220/570 |
| 2014/0183322 A1* | 7/2014 | Starr | ................. | A47J 47/16 |
| | | | | 248/129 |
| 2017/0188704 A1 | 7/2017 | Lipper McCauley | | |
| 2018/0132614 A1* | 5/2018 | Lipper McCauley | ................. | |
| | | | | A47B 88/483 |

* cited by examiner

MULTI-DIRECTIONAL MOVEMENT COUNTERTOP APPLIANCE ROLLING TRAY

REFERENCE TO RELATED APPLICATION

This application is a continuation-in-part of U.S. application Ser. No. 16/879,510, which was filed on May 20, 2020, which claims priority to U.S. Application No. 62/988,596, which was filed on Mar. 12, 2020.

This application claims benefit of Provisional U.S. Application No. 63/082,127, which was filed on Sep. 23, 2020. The contents of which are incorporated herein by reference.

FIELD OF THE INVENTION

The invention relates to objects for kitchen organization. More particularly, the invention relates to a multi-directional movement countertop appliance rolling tray.

BACKGROUND OF THE INVENTION

There is a limited amount of space on countertops in most kitchens. The countertop is used for storing countertop appliances such as blenders, coffee makers and toasters. The countertop may also be used for storing certain food items, examples of which include fresh fruit and spices, and preparing food.

While it is possible to store these countertop appliances in cabinets, that is typically not desired for countertop appliances that are used on a regular basis. To minimize the interference with performing tasks such as cooking on the countertop, the countertop appliances that are not currently being used may be positioned proximate a wall at a back edge of the countertop.

When it is desired to use the countertop appliance, the item may be moved toward a front edge of the countertop. Such movement not only makes it easier to reach the controls on the countertop appliance but also minimizes interference of the use of the countertop appliance by cabinets that are located at least partially above the countertop appliance.

SUMMARY OF THE INVENTION

An embodiment of the invention is directed to a multi-directional movement countertop appliance rolling tray that includes a support surface, at least one high friction support, at least one first multi-directional low friction moving device and a movement lever. The support surface has a front edge, a back edge, a first side edge and a second side edge that extend there around. The at least one high friction support proximate the front edge of the support surface. The movement lever operably is mounted with respect to the support surface. The at least one first multi-directional low friction moving device is rotatably mounted to the movement lever. The movement lever is movable between a first position and a second position. When the movement lever is in the second position, a lower surface of the first multi-directional low friction moving device extends further from the support surface than a lower surface of the at least one high friction support.

Another embodiment of the invention is directed to a method of using of a countertop appliance. A multi-directional countertop appliance rolling tray is provided that includes a support surface, at least one high friction support, a movement lever and an at least one first multi-directional low friction moving device. The support surface has a front edge, a back edge, a first side edge and a second side edge that extend there around. The at least one high friction support is proximate the front edge of the support surface. The movement lever is operably mounted with respect to the support surface. The at least one first multi-directional low friction moving device is mounted to the movement lever for rotation in more than one direction. The movement lever is movable between a first position and a second position and wherein when the movement lever is in the first position, a lower surface of the at least one first multi-directional low friction moving device is not further from the support surface than a lower surface of the at least one high friction support. The multi-directional countertop appliance rolling tray is placed on a countertop. The countertop has a proximal edge and a distal edge. The at least one high friction support resists movement with respect to the countertop to a greater extent than the at least one first multi-directional low friction moving device. A countertop appliance is placed on the multi-directional countertop appliance rolling tray. A force is applied to the movement lever to move the movement lever to the second position and to move the multi-directional countertop appliance rolling tray to a use position proximate the distal edge of the countertop. The moving of the multi-direction countertop appliance rolling tray is in more than one direction. The force is discontinued to permit the movement lever to move to the first position.

Another embodiment of the invention is directed to a countertop appliance system that includes a countertop appliance and a multi-directional countertop appliance rolling tray. The multi-directional countertop appliance rolling tray includes a support surface, at least one high friction support, at least one first multi-directional low friction moving device and a movement lever. The support surface has a front edge, a back edge, a first side edge and a second side edge that extend there around. The least one high friction support is proximate the front edge of the support surface. The movement lever operably is mounted with respect to the support surface. The at least one first multi-directional low friction moving device is operably attached to the movement lever. The movement lever is movable between a first position and a second position. When the movement lever is in the first position, a lower surface of the at least one first multi-directional low friction moving device is not further from the support surface than a lower surface of the at least one high friction support. When the movement lever is in the second position, the lower surface of the first multi-directional low friction moving device is further from the support surface than the lower surface of the at least one high friction support.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION OF THE INVENTION

Figure 1:
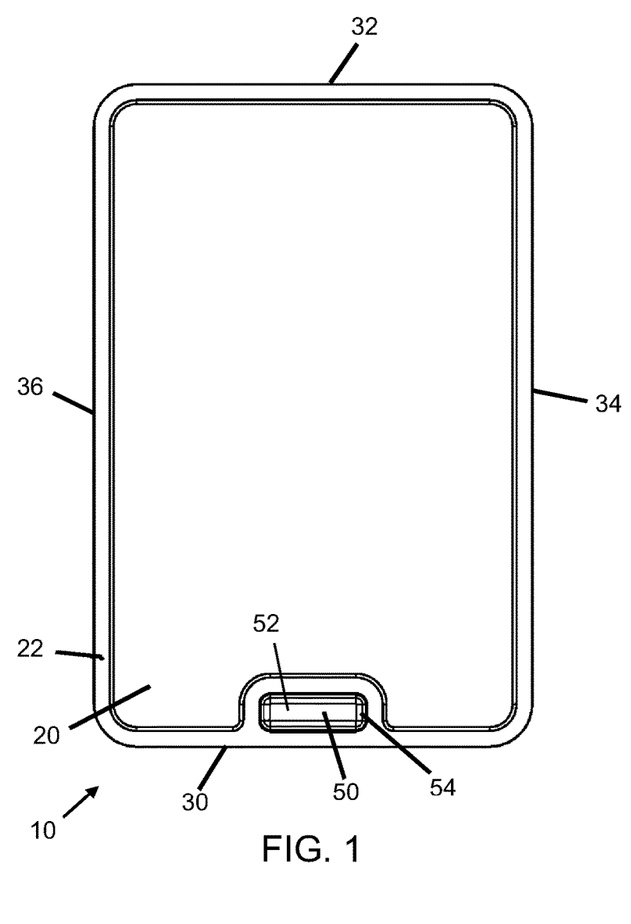
FIG. 1 is a top view of a multi-directional movement countertop appliance rolling tray according to an embodiment of the invention.
Figure 2:
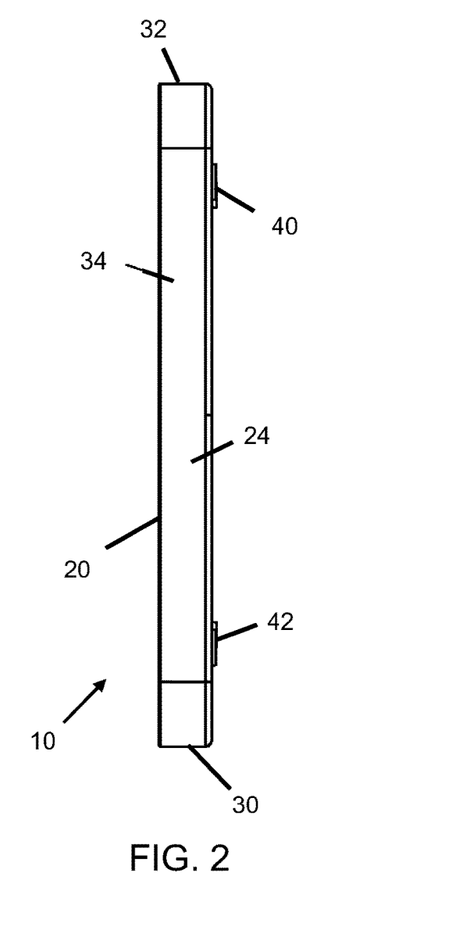
FIG. 2 is a side view of the multi-directional movement countertop appliance rolling tray.
Figure 3:
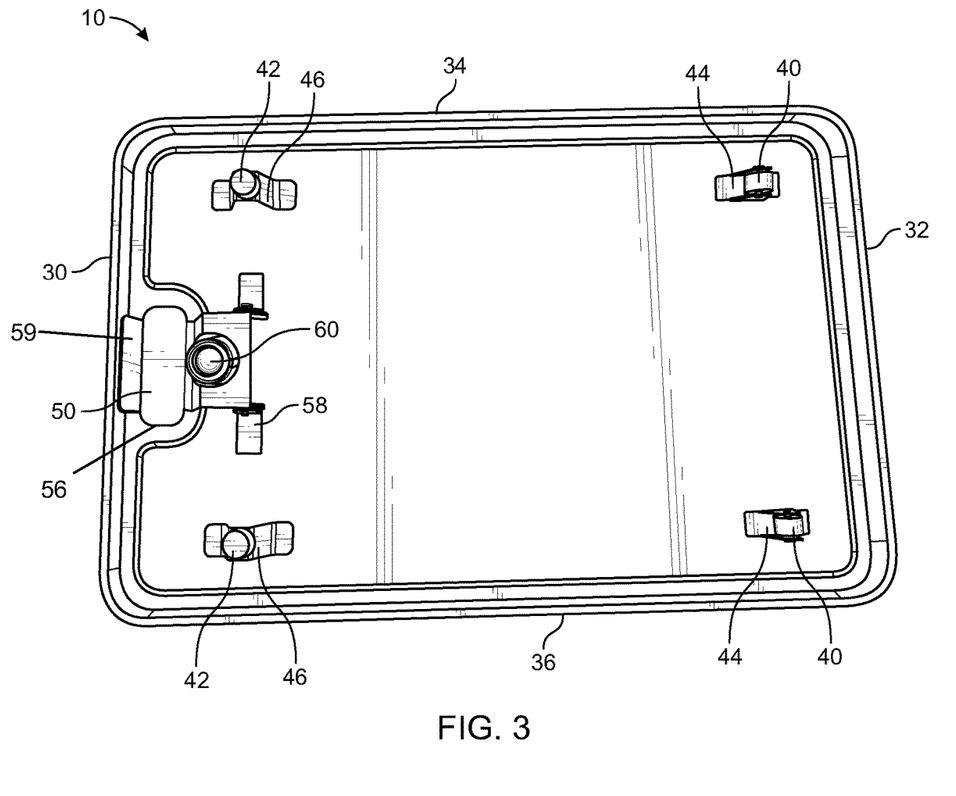
FIG. 3 is a bottom view of the multi-directional movement countertop appliance rolling tray.
Figure 4:
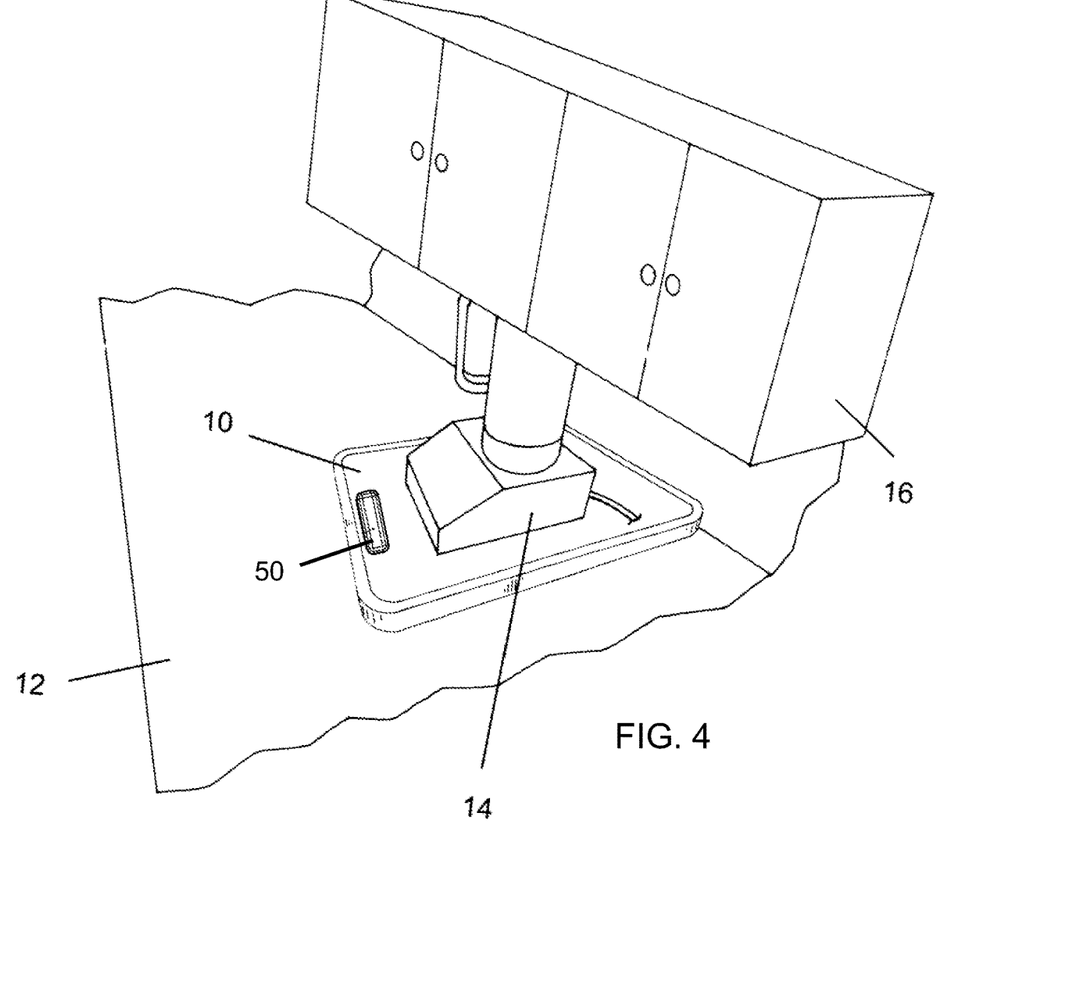
FIG. 4 is a perspective view of the multi-directional movement countertop appliance rolling tray with a countertop appliance placed thereon.

An embodiment of the invention is directed to a multi-directional movement countertop appliance rolling tray as illustrated at 10 in FIGS. 1-3. The multi-directional movement countertop appliance rolling tray 10 is adapted for use on a countertop 12 such as is typically found in a kitchen, as illustrated in FIG. 4.

The multi-directional movement countertop appliance rolling tray 10 is adapted for a countertop kitchen appliance 14 to be placed thereon. Examples of appliances 14 that may be used in conjunction with the multi-directional movement countertop appliance rolling tray 10 include blenders, coffee makers and toasters.

The multi-directional movement countertop appliance rolling tray 10 thereby enables the countertop appliance 14 to be stored on the countertop 12 proximate a back edge of the countertop 12 so that the countertop appliance 14 is readily accessible when it is desired to use the countertop appliance 14 while the countertop appliance 14 does not interfere or impede the use of a portion of the countertop 12 that is proximate a front edge thereof.

Another advantage of the multi-directional movement countertop appliance rolling tray 10 is that the countertop appliance 14 may be stored in a reduced height area such as at least partially under a cabinet 16 mounted over the countertop 12. In certain situations, the cabinet 16 would make it difficult or impossible to use features associated with the appliance, examples of which include placing objects into the blender, coffee maker or toaster.

Another important feature of the multi-directional movement countertop appliance rolling tray 10 is that an upper surface of the multi-directional movement countertop appliance rolling tray 10 is located a small distance above an upper surface of the countertop 12 such as less than about one inch. Such a configuration minimizes the potential that countertop appliances 14 placed on the multi-directional movement countertop appliance rolling tray 10 will not fit under the cabinet 16 when placed on the multi-directional movement countertop appliance rolling tray 10.

Yet another important feature of the multi-directional movement countertop appliance rolling tray 10 is that a relatively low force is needed to move the multi-directional movement countertop appliance rolling tray 10 from a stationary configuration to a moving configuration and once the multi-directional movement countertop appliance rolling tray 10 is in the moving configuration to move the multi-directional movement countertop appliance rolling tray 10 with respect to the countertop or other surface on which the multi-directional movement countertop appliance rolling tray 10 is placed. As used herein, the relatively low force is less than about 5 pounds. In other embodiments, the force is less than about 2 pounds.

Through the use of the multi-directional movement countertop appliance rolling tray 10, the amount of energy needed to move the countertop appliance 14 that is placed on the multi-directional movement countertop appliance rolling tray 10 is less than the energy needed to move the countertop appliance by lifting the countertop appliance 14 off the countertop 12.

Another important feature of the multi-directional movement countertop appliance rolling tray 10 is that the multi-directional movement countertop appliance rolling tray 10 can move in a multi-directional motion, thus eliminating the possible need to remove the countertop appliance 14 and the multi-directional movement countertop appliance rolling tray 10 from the countertop 12 in the event that it is needed to move the countertop appliances 14 in a non-linear motion between the storage location and the use location.

Still another important feature of the multi-directional movement countertop appliance rolling tray 10 is that the multi-directional movement countertop appliance rolling tray 10 supports the countertop appliance 14 with a high degree of stability in both the stationary configuration and the moving configuration to minimize the potential of the countertop appliance 14 falling after being placed on the multi-directional movement countertop appliance rolling tray 10 either while the countertop appliance 14 is being stored, while the countertop appliance 14 is being used or while the countertop appliance 14 is being moved from the storage location proximate the back edge of the countertop 12 to the use location proximate the front edge of the countertop 12.

A typical distance between a countertop 12 and a wall-mounted cabinet 16 in kitchens is about 18 inches. Many countertop appliances 14 are fabricated based upon the distance between an upper surface of the countertop 12 and a lower surface of wall-mounted cabinets 16.

Fabricating the countertop appliances 14 with a height that is less than 18 inches enables the countertop appliances 14 to be placed under the wall-mounted cabinet 16 when not in use. Such a configuration enables the countertop appliances 14 to be readily accessible while not interfering with the use of the wall-mounted cabinets 16.

This configuration also minimizes the amount of the countertop 12 that is occupied by the countertop appliance 14 proximate a front edge thereof so that the countertop 12 can be used for other tasks that do not utilize the countertop appliance 14 and thereby increases the likelihood that the countertop appliance 14 will be stored on the countertop 12 instead of being stored in another area.

Enhancing the ability to perform tasks in the kitchen and reducing clutter on the kitchen countertops increases the overall enjoyment of the cooking process, which increases the likelihood that more meals will be cooked in the kitchen and reduces the likelihood of persons substituting fast food meals, which is typically less healthful than home cooked meals.

Particularly with taller countertop appliances 14 such as blenders and coffee makers, these items are designed to fit under the wall-mounted cabinets 16 with a height that is slightly smaller than the distance between the upper surface of the countertop 12 and the lower surface of the wall-mounted cabinet 16.

The height of the countertop appliance 14 is selected based upon the assumption that the countertop appliance 14 will be placed directly on the countertop 12. Therefore, many countertop appliances 14 are formed with a height that is close to about 18 inches. In other embodiments, the countertop appliances 14 have a height that is between about 18 inches and about 16 inches.

To facilitate using the multi-directional movement countertop appliance rolling tray 10 with a large proportion of countertop appliances 14 that are intended to fit under wall-mounted kitchen cabinets 16, a distance between the top of the countertop 12 and the support surface 20 is less than about 1 inch. In other embodiments, the distance between the top of the countertop 12 and the support surface 20 is less than about ¾ of an inch.

While certain countertop appliances 14 such as basic toasters have a relatively light weight, other countertop appliances 14 such as blenders and coffee makers have a relatively large weight. These heavier and/or larger countertop appliances 14 may present challenges for a person to lift and move. In many situations, countertop appliances 14 are formed with feet or other surface that contacts the countertop that resists movement such as rubber, which presents challenges to sliding the countertop appliance 14 on the countertop 12.

Rather than attempting the move the heavier and/or larger countertop appliances to a different location on the countertop, these types of countertop appliances may be placed at less convenient locations in the kitchen. Such less convenient locations may cause the person using the countertop kitchen appliances to significantly increase the distance that the person needs to walk when cooking certain items. Additionally, the less convenient placement of the countertop appliances may require heavy and/or hot objects to be carried further distances, which increases the potential of such items dropping and/or causing injury to persons cooking in the kitchen. Alternatively, the countertop appliances may be stored in a cabinet or pantry.

The multi-directional movement countertop appliance rolling tray 10 generally includes a support surface 20. In certain embodiments, the support surface 20 is fabricated with an elongated configuration that is selected with a width and a length based on the dimensions of the countertop appliance 14 that is intended to be placed on the support surface 20. In certain embodiments, the width and the length of the support surface 20 are each between about 5 inches and about 20 inches. In other embodiments, the width and the length of the support surface 20 are each between about 10 inches and about 15 inches.

While it is illustrated that the support surface 20 has a generally rectangular shape, it is possible for the support surface 20 to be formed with alternative shapes using the concepts of the invention, examples of which include square, round and oval.

The support surface 20 may generally include a front edge 30, a back edge 32, a first side edge 34 and a second side edge 36. In certain embodiments, the front edge 30 may have a length that is approximately equal to a length of the back edge 32 and the first side edge 34 may have a length that is approximately equal to a length of the second side edge 36.

The support surface 20 may be fabricated from a material that resists bending and/or deformation when the countertop appliance 14 is placed thereon. The support surface 20 should also be fabricated from a material that resists damage and/or deformation such as from heat emitted by the countertop appliance 14. In certain embodiments, the support surface 20 is fabricated from a metallic or polymeric material.

At least a portion of the support surface 20 may have a reduced slip coating 38 to reduce the potential of the countertop appliance 14 placed thereon from moving with respect to the support surface 20. While it is illustrated that the reduced slip coating 38 substantially covers the support surface 20, such a configuration is not necessary. Rather, the reduced slip coating 38 needs to be located where at least a portion of the countertop appliance 14 contacts the support surface 20.

In another embodiment, an adhesive may be positioned proximate to where the countertop appliance 14 contacts support surface 20 to reduce the potential of the countertop appliance 14 moving with respect to the multi-directional movement countertop appliance rolling tray 10.

In still other embodiments, a mechanical fastener such as a screw or clip (not shown) may be used to attach the countertop appliance 14 to the support surface 20 to prevent the countertop appliance 14 from moving with respect to the multi-directional movement countertop appliance rolling tray 10.

To assist in positioning the countertop appliance 14 on the support surface 20, a lip 22 may extend from the support surface 20 at least partly around the support surface 20. In certain embodiments, the lip 22 extends substantially around the support surface 20. Alternatively or additionally, the multi-directional movement countertop appliance rolling tray 10 may include text and/or images on the surface thereof that assist users to position the countertop appliance 14 on the multi-directional movement countertop appliance rolling tray 10. For example, an outline of a base of a blender may be printed on the support surface 20.

The lip 22 may be sufficiently high so that the person placing the countertop appliance 14 on the multi-directional movement countertop appliance rolling tray 10 appreciates the boundaries of the support surface 20. In certain embodiments, the lip 22 has a height of less than about ¼ of an inch. Positioning the countertop appliance 14 proximate a center of the support surface 20 may enhance the stability and reduce the potential of the countertop appliance 14 falling after being placed on the multi-directional movement countertop appliance rolling tray 10.

The lip 22 also encourages placement of the countertop appliance 14 proximate a center of the multi-directional movement countertop appliance rolling tray 10 to minimize the potential of the multi-directional movement countertop appliance rolling tray 10 tipping either when the countertop appliance 14 is being used or the multi-directional movement countertop appliance rolling tray 10 is being moved with the countertop appliance placed 14 thereon.

To enhance structural integrity of the support surface 20, a side wall 24 may extend from the support surface 20. While the drawings illustrate that the side wall 24 extends downwardly towards the surface on which the multi-directional movement countertop appliance rolling tray 10 is placed, it is possible for the side wall 24 to be directed upwardly. In certain embodiments the side wall 24 extends substantially around the support surface 20.

When the multi-directional movement countertop appliance rolling tray 10 is in a stationary configuration, at least a portion of the side wall 24 may contact the countertop 12 or other surface on which the multi-directional movement countertop appliance rolling tray 10 is placed. When the multi-directional movement countertop appliance rolling tray 10 is in a moving configuration, substantially none of the side wall 24 contacts the countertop 12.

On a lower surface of the support surface 20 proximate the back edge 32, a first low friction moving device 40 is provided, as illustrated in FIG. 3. The first low friction moving device 40 may be attached to the first low friction moving device mount 44. The first low friction moving device mount 44 is attached to the lower surface of the support surface 20 proximate the back edge 32. The first low friction moving device 40 facilitates movement of the multi-directional movement countertop appliance rolling tray 10 on the countertop 12.

One of the first low friction moving devices 40 is positioned proximate the intersection of the back edge 32 and the first side edge 34 and one of the first low friction moving devices 40 is positioned proximate the intersection of the back edge 32 and the second side edge 36.

A lower surface of the low friction moving device 40 extends a distance from the support surface 20 that is greater than a distance that the side wall 24 extends from support surface 20. In certain embodiments, the difference between the distance the lower surface of the first low friction moving device 40 extends from the support surface 20 and the distance the side wall 24 extends from the support surface 20 is less than about ¼ of an inch.

In certain embodiments, the first low friction moving devices 40 are positioned proximate the side edges 34, 36. As used herein, proximate means that a distance between the low friction moving device 40 and the closest side edge 34, 36 is less than about 20 percent of a distance between the side edges 34, 36. In other embodiments, the distance between the low friction moving device 40 and the closest side edge 34, 36 is between about 10 and 15 percent of the distance between the side edges 34, 36. To enhance the stability of the multi-directional movement countertop appliance rolling tray 10, the distance between each of the first low friction moving devices 40 and the side edges 34, 36 are about equal.

In certain embodiments, the first low friction moving devices 40 are positioned proximate the back edge 32. As used herein, proximate means that a distance between the first low friction moving device 40 and the back edge 32 is less than about 20 percent of a distance between the front edge 30 and the back edge 32. In other embodiments, the distance between the first low friction moving device 40 and the back edge 32 is between about 10 and 15 percent of the distance between the front edge 30 and the back edge 32. To enhance the stability of the multi-directional movement countertop appliance rolling tray 10, the distance between each of the low friction moving devices 40 and the back edge 32 is about equal.

In certain embodiments, the first low friction moving device 40 is at least one wheel. The at least one wheel may have a relatively small diameter such as less than about ½ of an inch so that the support surface 20 may be a small distance from the countertop 12 on which the multi-directional movement countertop appliance rolling tray 10 is placed. In another embodiment, the first low friction moving device 40 is fabricated from a low friction material such as TEFLON™. Such a device would slide along the countertop as opposed to rolling on the countertop.

In another embodiment, the first low friction moving device 40 is at least one rolling ball. The at least one rolling ball may have a relatively small diameter such as less than about ¾ of an inch with respect to the rolling ball so that the support surface 20 may be a small distance from the countertop 12 on which the multi-directional movement countertop appliance rolling tray 10 is placed. The first low friction moving device 40 of this embodiment is created from a low friction material such as plastic, metal or glass. Such a device would allow the rolling ball to move freely along the countertop in all directions.

On the lower surface of the support surface 20 proximate the front edge 30, a high friction support 42 is provided, as illustrated in FIG. 3. The high friction support 42 is mounted onto the high friction support mount 46. The high friction support mount 46 may be positioned proximate the intersection of the front edge and the first side edge and proximate the intersection of the front edge 30 and the second side edge 36. The spacing between the high friction support mount 46 may be similar to the spacing between the first low friction moving device and mount 40, 44.

The high friction support 42 resists movement of the multi-directional movement countertop appliance rolling tray 10 with respect to the countertop 12 when the high friction support 42 is in contact with the countertop 12. An example of one suitable high friction support 42 is rubber. In certain embodiments, the high friction supports 42 are positioned proximate the side edges 34, 36. As used herein, proximate means that a distance between the high friction support 42 and the closest side edge 34, 36 is less than about 20 percent of a distance between the side edges 34, 36. In other embodiments, the distance between the high friction support 42 and the closest side edge 34, 36 is between about 10 and 15 percent of the distance between the side edges 34, 36. To enhance the stability of the multi-directional movement countertop appliance rolling tray 10, the distance between each of the high friction supports 42 and the side edge 34, 36 is about equal.

In certain embodiments, the high friction supports 42 are positioned proximate the front edge 30. As used herein, proximate means that a distance between the high friction support 42 and the front edge 30 is less than about 20 percent of a distance between the front edge 30 and the back edge 32. In other embodiments, the distance between the high friction support 42 and the front edge 30 is between about 10 and 15 percent of the distance between the front edge 30 and the back edge 32. To enhance the stability of the multi-directional movement countertop appliance rolling tray 10, the distance between each of the high friction supports 42 and the front edge 30 is about equal.

A movement lever 50 is operably mounted with respect to the support surface 20. In certain embodiments, the movement lever 50 is positioned proximate the front edge 30. In certain embodiments, the movement lever 50 is pivotally mounted to a lower side of the support surface 20.

The movement lever 50 is positioned in an interior of the multi-directional movement countertop appliance rolling tray 10. Using such a configuration, no portion of the movement lever 50 extends through the side wall 24.

The movement lever 50 may have a generally planar central region 52. An elevated region 54 may extend at least partially around the planar central region 52. The elevated region 54 thereby enhances the ability of a person to position his/her fingers on the movement lever 50. The elevated region may also reduce the need of the person to visually look at the movement lever 50 when operating the movement lever 50 and/or when moving the multi-directional movement countertop appliance rolling tray 10 with the countertop appliance 14 placed thereon.

The elevated region 54 may also enhance the ability of the person moving the multi-directional movement countertop appliance rolling tray 10 to remain in contact with the movement lever 50 as the multi-directional movement countertop appliance rolling tray 10 is being moved.

The movement lever 50 is pivotally mounted on the interior portion of the multi-directional movement countertop appliance rolling tray 10 using a frame element 58. In certain embodiments, the movement lever 50 pivots up to about 20 degrees.

The support surface 20 has an aperture 56 formed therein. The aperture 56 may have a shape that is similar to the shape of the portion of the movement lever 50 that is contacted by the user's fingers. An edge of the aperture 56 that is closest to the front edge 30 is proximate the front edge 30. However, the aperture 56 is spaced-apart from the front edge 30.

Along at least a portion of an edge of the aperture 56 that is closest to the front edge 30 may include a panel 59 that extends downwardly from the support surface 20. The panel 59 may extend substantially across a width of the aperture 56. The panel 59 may have a height that is similar to a height of the side wall 24.

Using this configuration enables the user's fingers to contact the panel 59 when placing a downward force on the movement lever 50. Such contact with the panel 59 enhances the ability of the person to move the multi-directional movement countertop appliance rolling tray 10 with the countertop appliance 14 placed thereon. The configuration of the multi-directional movement countertop appliance rolling tray 10 is particularly beneficial with heavier countertop appliances 14 since the weight of the countertop appliance 14 may reduce the ability of the first low friction moving device 40 to freely move.

A multi-directional low friction moving device 60 is provided on the movement lever 50. In certain embodiments, the multi-directional low friction moving device 60 is a rolling ball. The multi-directional low friction moving device 60 is about 50 percent the distance between the side edges 34, 36, proximate the front edge 30. The multi-directional low friction moving device 60 facilitates movement of the multi-directional movement countertop appliance rolling tray 10 in a steering wheel like motion on the countertop 12.

In another embodiment, the multi-directional low friction moving device 60 is at least two rolling balls (not shown) are mounted on the movement lever 50 in a spaced apart configuration.

The at least one rolling ball 60 may have a relatively small diameter so that the support surface 20 may be a small distance from the countertop 12 on which the multi-directional movement countertop appliance rolling tray 10 is placed. In certain embodiments, the diameter of the at least one rolling ball 60 is about ¾ of an inch. In an embodiment, the multi-directional low friction moving 60 is fabricated from a material such as plastic, metal or glass.

The multi-directional low friction moving device 60 may be positioned closer to the front edge 30 of the countertop 12 than the high friction support 42 as illustrated in FIG. 3. Using such a configuration allows the at least one multi-directional low friction moving device 60 to roll off the front edge of the countertop 12 while the high friction support 42 remain on the countertop 12 and restricts further movement of the multi-directional movement countertop appliance rolling tray 10. Thus, preventing the multi-directional movement countertop appliance rolling tray 10 and the countertop appliance 14 from falling off the countertop 12.

Because the rolling ball 60 engages the counter 12 when a downward force is placed on the movement lever 50 during the process of moving the multi-directional movement countertop appliance rolling tray 10. The force applied by the user combined with the even placement of both the low friction moving device and mount 40, 44 and the high friction support and mount 42, 46 reduces the potential of the countertop appliance 14 from laterally tipping during the movement process. As such, this stability allows for there to be a single movement point proximate the front edge 30 of the multi-directional movement countertop appliance rolling tray 10.

In an alternative embodiment, the multi-directional movement countertop appliance rolling tray 10 avoids laterally tipping during the movement process, due to the downward force placed on the movement lever 50 by the person moving the countertop appliance and the multi-directional movement countertop appliance rolling tray 10. As such, it is possible for the two rolling balls (not shown) to be positioned closer together than the first low friction moving device 40 or the high friction support 42.

In another embodiment, the spacing between the two rolling balls is between about 10 percent and about 30 percent of a distance between the side edges 34, 36. In other embodiments, the distance between the two rolling balls is between about 15 percent and about 20 percent of the distance between the side edges 34, 36.

In yet another embodiment, one of the first low friction moving devices and mounts 40, 44 is positioned proximate the back edge 32 and the first side edge 34 and one of the first low friction moving devices and mounts 40, 44 is positioned proximate the back edge 32 and the second side edge 36. The first low friction moving devices 40 may have a relatively small diameter so that the support surface 20 may be a small distance from the countertop 12.

In use, the multi-directional movement countertop appliance rolling tray 10 is placed on a countertop 12 and a countertop appliance 14 is placed on the multi-directional movement countertop appliance rolling tray 10. In an initial storage position, the multi-directional movement countertop appliance rolling tray 10 may be proximate to a distal edge of the countertop 12, as illustrated in FIG. 4. When in the storage portion, at least a portion of the multi-directional movement countertop appliance rolling tray 10 and the countertop appliance 14 are located below a cabinet 16.

While the multi-directional movement countertop appliance rolling tray 10 is in the storage position, the portion of the countertop 12 proximate the proximal edge thereof may be substantially unobstructed so that this portion of the countertop 12 may be used to perform other tasks without interference from the multi-directional movement countertop appliance rolling tray 10 and the countertop appliance 14.

Depending on the nature of the countertop appliance 14 and the spacing between the countertop 12 and the lower surface of the cabinet 16, the proximity of the cabinet 16 to the countertop appliance 14 may impede the ability to use the countertop appliance 14.

When it is desired to use the countertop appliance 14, the user exerts a downward relatively low force on the movement lever 50 to cause the multi-directional low friction moving device 60 to engage the countertop 12 and the high friction support 42 to be raised above the countertop 12. As used herein, the relatively low force is less than about 5 pounds. In other embodiments, the force is less than about 2 pounds.

With continued downward force on the movement lever 50, the user exerts a force on the movement lever 50 towards the proximal edge of the countertop 12 to cause the multi-directional movement countertop appliance rolling tray 10 and the countertop appliance 14 placed thereon to move towards the proximal edge of the countertop 12. The user may also exert a force on the portion of the multi-directional movement countertop appliance rolling tray 10 that is proximate the leading edge or the trailing edge of the aperture 56 depending on whether the user is moving the multi-directional movement countertop appliance rolling tray 10 towards the proximal or leading edge of the countertop 12.

The force needed to cause the multi-directional movement countertop appliance rolling tray 10 with the countertop appliance 14 thereon is relatively low. As used herein, the relatively low force is less than about 5 pounds. In other embodiments, the force is less than about 2 pounds.

Once the multi-directional movement countertop appliance rolling tray 10 and the countertop appliance 14 is at a desired position with respect to the countertop 12, the user removes the downward force from the movement lever 50, which causes the movement lever 50 to pivot until the high friction support 42 contacts the countertop 12. The engagement of the high friction support 42 and the countertop 12 causes the multi-directional movement countertop appliance rolling tray 10 to resist movement with respect to the countertop 12.

When the user is done using the countertop appliance 14, the process set forth above is reversed to cause the multi-directional movement countertop appliance rolling tray 10 and the countertop appliance 14 to be moved to the storage configuration, which is illustrated in FIG. 4.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A multi-directional movement countertop appliance rolling tray comprising:
   a support surface having a front edge, a back edge, a first side edge and a second side edge that extend there around, wherein the support surface has an aperture formed therein;
   at least one high friction support proximate the front edge of the support surface;
   at least one first multi-directional low friction moving device;
   a panel that extends from the support surface along at least a portion of an edge of the aperture that is towards the front edge of the support surface; and
   a movement lever operably mounted with respect to the support surface, wherein the at least one first multi-directional low friction moving device is rotatably mounted to the movement lever, wherein the movement lever is movable between a first position and a second position wherein when the movement lever is in the second position, a lower surface of the first multi-directional low friction moving device extends further from the support surface than a lower surface of the at least one high friction support and wherein the movement lever is operable by contact of the movement lever through the aperture.

2. The multi-directional countertop appliance rolling tray of claim 1, wherein the at least one first multi-directional low friction moving device is a ball wherein the ball is rotatably mounted to the movement lever for rotation in more than one direction and wherein the multi-directional countertop appliance rolling tray further comprises at least one second low friction moving device proximate the back edge of the support surface.

3. The multi-directional countertop appliance rolling tray of claim 1, wherein the first multi-directional low friction moving device is closer to the front edge than the at least one high friction support.

4. The multi-directional countertop appliance rolling tray of claim 1, wherein the at least one high friction support comprises a first high friction support and a second high friction support, wherein the first high friction support is mounted to the support surface proximate the first side edge and wherein the second high friction support is mounted to the support surface proximate the second side edge.

5. The multi-directional countertop appliance rolling tray of claim 1, wherein a distance between an upper surface of the multi-directional countertop appliance rolling tray and a lower surface of the multi-directional countertop appliance rolling tray is less than about one inch.

6. The multi-directional countertop appliance rolling tray of claim 1, wherein the movement lever is operably attached to the support surface proximate the front edge and wherein the movement lever further comprises a location identification mechanism that is oriented towards an upper side of the support surface and wherein the location identification mechanism comprises an elevated region that at least partially extends around a central planar region of the movement lever.

7. The multi-directional countertop appliance rolling tray of claim 1, wherein the support surface further comprises a side wall that extends below a lower side of the support surface and the side wall extends substantially around the support surface, wherein no portion of the movement lever extends through the side wall and wherein the panel has a height that is similar to a height of the side wall.

8. A method of using of a countertop appliance comprising:
   providing a multi-directional countertop appliance rolling tray comprising a support surface, at least one high friction support, a panel, a movement lever and an at least one first multi-directional low friction moving device, wherein the support surface has a front edge, a back edge, a first side edge and a second side edge that extend there around, wherein the support surface has an aperture formed therein, wherein the at least one high friction support is proximate the front edge of the support surface, wherein the panel that extends from the support surface along at least a portion of an edge of the aperture that is towards the front edge of the support surface, wherein the movement lever is operably mounted with respect to the support surface, wherein the at least one first multi-directional low friction moving device is mounted to the movement lever for rotation in more than one direction, wherein the movement lever is movable between a first position and a second position and wherein when the movement lever is in the first position, a lower surface of the at least one first multi-directional low friction moving device is not further from the support surface than a lower surface of the at least one high friction support;
   placing the multi-directional countertop appliance rolling tray on a countertop, wherein the countertop has a proximal edge and a distal edge, wherein the at least one high friction support resists movement with respect to the countertop to a greater extent than the at least one first multi-directional low friction moving device;

placing a countertop appliance on the multi-directional countertop appliance rolling tray;
applying a force to the movement lever to through the aperture to:
  move the movement lever to the second position; and
  move the multi-directional countertop appliance rolling tray to a use position proximate the distal edge of the countertop, wherein the moving of the multi-direction countertop appliance rolling tray is in more than one direction; and
discontinuing the force to permit the movement lever to move to the first position.

9. The method of claim 8, wherein the force is also applied to the support surface proximate a leading edge or a trailing edge of the aperture.

10. The method of claim 8, wherein an object is mounted above the countertop, wherein before the multi-directional countertop appliance rolling tray is moved to the use position, the multi-directional countertop appliance rolling tray is in a storage position proximate the distal edge of the countertop, wherein when the multi-directional countertop appliance rolling tray is in the storage position, the countertop appliance is at least partially under the object, wherein the countertop appliance has an operational feature, wherein when the multi-directional countertop appliance rolling tray is in the storage position, the object impedes a user from performing the operational feature and wherein when the multi-directional countertop appliance rolling tray is in the use position, the object does not impede a user from performing the operational feature.

11. The method of claim 10, wherein a distance between a lower surface of the object and an upper surface of the countertop is less than about 18 inches and wherein a distance between an upper surface of the multi-directional countertop appliance rolling tray and a lower surface of the multi-directional countertop appliance rolling tray is less than about one inch.

12. The method of claim 8, wherein the force is less than about 5 pounds.

13. The method of claim 8, wherein the at least one high friction support comprises a rubber pad and wherein the movement lever is operably attached to the support surface proximate the front edge.

14. The method of claim 8, and further comprising identifying a location at which the force is applied to the movement lever with a location identification mechanism on a surface thereof that is oriented towards an upper side of the support surface and wherein the location identification mechanism comprises an elevated region that at least partially extends around a central planar region of the movement lever.

15. The method of claim 8, wherein the at least one first multi-directional low friction moving device is closer to the front edge of the support surface than the at least one high friction support and wherein when the at least one first multi-directional low friction moving device moves beyond the proximal edge of the countertop, the at least one high friction support contacts the countertop and restricts movement of the multi-directional countertop appliance rolling tray on the countertop.

16. A countertop appliance system comprising:
a countertop appliance; and
a multi-directional countertop appliance rolling tray comprising:
  a support surface having a front edge, a back edge, a first side edge and a second side edge that extend there around, wherein the support surface comprises a side wall that extends below a lower side of the support surface, wherein the side wall extends substantially around the support surface and wherein the support surface has an aperture formed therein;
  at least one high friction support proximate the front edge of the support surface;
  at least one first multi-directional low friction moving device;
  a panel that extends from the support surface along at least a portion of an edge of the aperture that is towards the front edge of the support surface; and
  a movement lever operably mounted with respect to the support surface so that no portion of the movement lever extends through the side wall, wherein the at least one first multi-directional low friction moving device is operably attached to the movement lever, wherein the movement lever is movable between a first position and a second position, wherein when the movement lever is in the first position, a lower surface of the at least one first multi-directional low friction moving device is not further from the support surface than a lower surface of the at least one high friction support, wherein when the movement lever is in the second position, the lower surface of the first multi-directional low friction moving device is further from the support surface than the lower surface of the at least one high friction support and wherein the movement lever is operable through the aperture.

17. The countertop appliance system of claim 16, wherein the countertop appliance is a blender, a coffee maker or a toaster and wherein the at least one high friction support comprises a rubber pad.

18. The countertop appliance system of claim 16, wherein a distance between an upper surface of the multi-directional countertop appliance rolling tray and a lower surface of the multi-directional countertop appliance rolling tray is less than about one inch and wherein the movement lever is operably attached to the support surface proximate the front edge.

19. The multi-directional countertop appliance rolling tray of claim 1, wherein the aperture has a shape that is similar to a shape of a portion of the movement lever that is contacted when moving the movement lever between the first position and the second position and wherein the aperture is spaced-apart from the front edge.

20. The multi-directional countertop appliance rolling tray of claim 1, wherein the panel extends substantially across a width of the aperture.

21. The countertop appliance system of claim 16, wherein the aperture has a shape that is similar to a shape of a portion of the movement lever that is contacted when moving the movement lever between the first position and the second position, wherein the aperture is spaced-apart from the front edge and wherein the panel extends substantially across a width of the aperture.

* * * * *